March 27, 1928.  
F. A. STEVENS  
1,664,095
OPHTHALMIC MOUNTING
Filed July 22, 1921
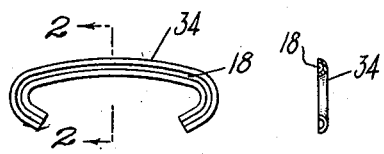
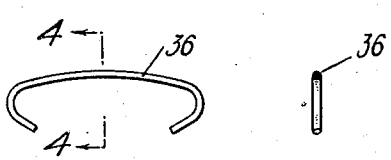
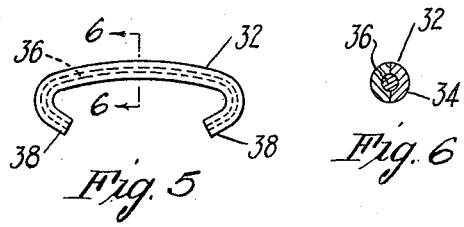
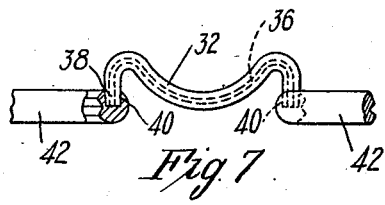
*Inventor:*  
Frederick A. Stevens  
by David Rines  
*Attorney:*

Patented Mar. 27, 1928.

1,664,095

UNITED STATES PATENT OFFICE.

FREDERICK A. STEVENS, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING.

Application filed July 22, 1921. Serial No. 486,703.

The present invention relates to ophthalmic mountings, particularly to mountings comprising parts constituted of nonmetallic material, such as shell, celluloid, zylonite and the like.

The invention consists of the improved ophthalmic mounting hereinafter described, illustrated in the accompanying drawings, and defined in the appended claims.

In the drawings, Fig. 1 is a rear elevation of a non-metallic part intended for use in the manufacture of a bridge according to the present invention; Fig. 2 is a section of the same taken upon the line 2—2 of Fig. 1; Fig. 3 is a view of a metal skeleton before assembly with the non-metallic parts; Fig. 4 is a section taken upon the line 4—4 of Fig. 3; Fig. 5 is a view of the completed bridge, comprising two non-metallic parts assembled with the metal skeleton; Fig. 6 is a section taken upon the line 6—6 of Fig. 5; and Fig. 7 shows the bridge of Fig. 5 connected to lens rims.

To prevent warping, bending, breaking, etc., the bridge 32 is, according to the present invention, reinforced by a reinforcing part or parts, preferably of metal. It is preferred to employ a metal skeleton in the form or a rod 36. The reinforcing skeleton is integrally combined with two or more separate non-metallic sheets 34, (whether or not provided with a groove or grooves 18 to receive the reinforcing rod) according to the method described in a copending application, Serial No. 613,811, filed January 20, 1923, as a continuation in part of the present application, as by the use of pressure and previously applied cement. The ends 38 of the bridge 32 may be connected to metal or non-metallic lens rims of any desired type, or they may be provided with lens clamps to adapt the bridge for use with mountings of the rimless type. For illustrative purposes, the ends 38 of the bridge are shown embedded in side recesses 40 of the rims 42 of the non-metallic type.

It will be appreciated that the invention is not restricted to the exact embodiment thereof that is herein illustrated and described, as modifications may be made by persons skilled in the art without departing from its spirit and scope. It is therefore desired that the above description be regarded as illustrative and not restrictive, and that the invention be considered as defined in the appended claim.

What is claimed as new is:

An ophthalmic mounting comprising a non-metallic bridge having a reenforcing metal skeleton, and a rim having a recess within which the end of the non-metallic bridge is embedded.

In testimony whereof, I have hereunto subscribed my name.

FREDERICK A. STEVENS.